US009262883B2

(12) United States Patent
Kishi

(10) Patent No.: US 9,262,883 B2
(45) Date of Patent: Feb. 16, 2016

(54) PERFORMANCE APPARATUS AS TOP BOX WITH EXTERNAL INPUT FOR GAMING MACHINE

(75) Inventor: Hideaki Kishi, Koto-ku (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 1658 days.

(21) Appl. No.: 11/757,010

(22) Filed: Jun. 1, 2007

(65) Prior Publication Data

US 2007/0287531 A1 Dec. 13, 2007

(30) Foreign Application Priority Data

Jun. 9, 2006 (JP) ................................. 2006-161653

(51) Int. Cl.

*G06F 19/00* (2011.01)
*G06F 17/00* (2006.01)
*G07F 17/32* (2006.01)
*G07F 17/34* (2006.01)

(52) U.S. Cl.

CPC ............ *G07F 17/32* (2013.01); *G07F 17/3202* (2013.01); *G07F 17/3223* (2013.01); *G07F 17/34* (2013.01)

(58) Field of Classification Search

CPC ............ G07F 17/3202; G07F 17/3211; G07F 17/3213; G07F 17/34; G07F 17/32; G07F 17/3218; G07F 17/3223; A63F 13/00; A63F 13/08; A63F 13/25; A63F 13/26; A63F 13/27; A63F 13/28

USPC .............................................. 463/35, 461, 16

See application file for complete search history.

(56) References Cited

U.S. PATENT DOCUMENTS

| | | | | |
|---|---|---|---|---|
| 6,146,273 | A * | 11/2000 | Olsen | 463/27 |
| 6,923,718 | B2 | 8/2005 | Brossard | |
| 6,923,720 | B2 * | 8/2005 | Loose | 463/16 |
| 7,008,324 | B1 * | 3/2006 | Johnson et al. | 463/42 |
| 2004/0166932 | A1 * | 8/2004 | Lam et al. | 463/30 |
| 2005/0060051 | A1 * | 3/2005 | Mattice et al. | 700/92 |
| 2006/0121967 | A1 * | 6/2006 | Paulsen et al. | 463/16 |

* cited by examiner

*Primary Examiner* — Lawrence Galka

(74) *Attorney, Agent, or Firm* — KMF Patent Services, PLLC; S. Peter Konzel; Kenneth M. Fagin

(57) ABSTRACT

A performance apparatus includes an accepting unit, a memory, an output unit and a performance unit. The accepting unit accepts first performance information from a source outside of the performance apparatus, and the memory stores second performance information. The output unit outputs one of a performance signal based on the first performance information accepted by the accepting unit and a performance signal based on the second performance information stored in the memory on the basis of a predetermined performance condition. The performance unit executes a performance according to the performance signal output from the output unit.

6 Claims, 6 Drawing Sheets

PERFORMANCE APPARATUS AS TOP BOX WITH EXTERNAL INPUT FOR GAMING MACHINE

CROSS REFERENCE TO RELATED APPLICATIONS

This application is based upon and claims the benefit of priority from the prior Japanese Patent Application No. 2006-161653, filed on Jun. 9, 2006; the entire contents of which are incorporated herein by reference.

BACKGROUND OF THE INVENTION

1. Field of the Invention

The present invention relates to a performance apparatus for a gaming machine and to a gaming machine.

2. Related Background of the Invention

Conventionally, as a performance apparatus used for a gaming machine or the like, a lighting apparatus, a sound generating device, an image display device and the like have been known. Generally, a performance of the performance apparatus is controlled by a predetermined performance program to make such performance apparatus execute various performances. For example, a technology relating to a control of an illumination and an audio in the performance apparatus incorporated into a slot machine is disclosed in U.S. Pat. No. 6,923,718.

SUMMARY OF THE INVENTION

The present inventors have repeated researches concerning the aforesaid performance apparatus, so that the inventors have newly found a performance apparatus capable of executing a performance with more seasoning, compared to a conventional performance apparatus.

Namely, the present invention aims at providing a performance apparatus capable of executing a performance with more seasoning.

The present invention provides a gaming machine includes: a performance information accepting means for accepting first performance information from a source outside of the performance apparatus; a performance information storage means for storing second performance information; a performance signal output means for outputting one of a performance signal based on first performance information accepted by the performance information accepting means and a performance signal based on second performance information stored in the performance information storage means on the basis of a predetermined performance condition; and a performance means for executing a performance according to a performance signal output from the performance signal output means.

DESCRIPTION OF THE PREFERRED EMBODIMENTS

Figure 1:
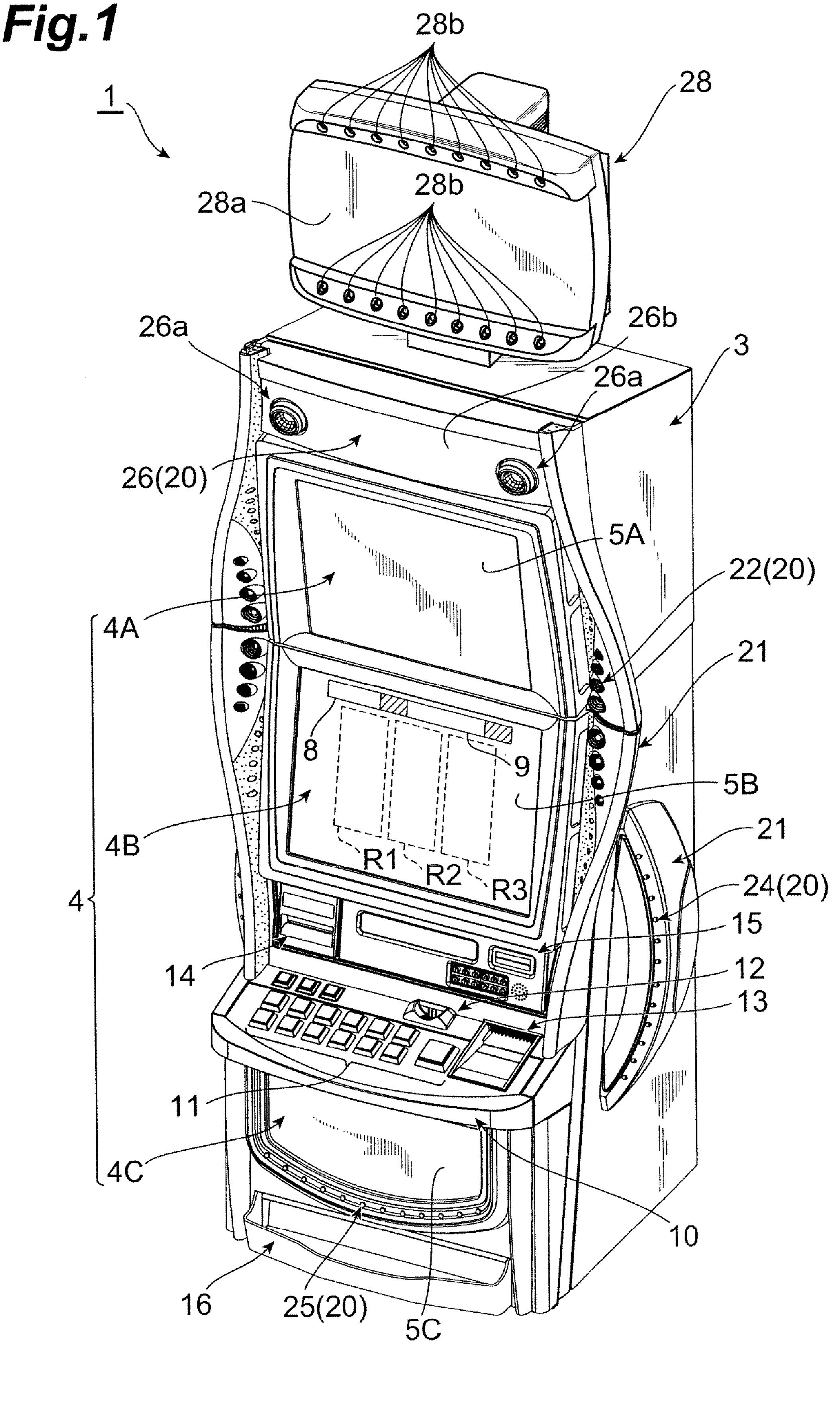
FIG. 1 is a perspective view showing a gaming machine in an embodiment of the present invention.

The preferred embodiment of the present invention will be described below in detail referring to the drawings.

As shown in FIG. 1, a gaming machine 1 is an upright-type slot machine installed in a game hall such as a casino, having a cabinet 3 for housing electrical or mechanical parts for executing a predetermined game. A display unit 4 for displaying information relating to a game may include an upper display unit 4A, a variable display unit 4B on a middle stage, and a lower display unit 4C, and each display unit 4A to 4C is provided on a front side of the vertically long cabinet 3. The upper display unit 4A has a liquid crystal panel 5A arranged above the variable display unit 4B, which displays a performance image, an introduction of gaming contents, a description of a gaming rule and the like. The lower display unit 4C is arranged under the variable display unit 4B, having a plastic panel 5C on which an image is photographed, and the plastic panel 5C is lighted up by a back-light.

The variable display unit 4B for displaying an execution state of a game includes a transparent liquid crystal panel 5B fixed on a front door of the cabinet 3, through which a player may see from outside, symbols of three series of reels R1, R2 and R3 arranged in the cabinet 3. On the variable display unit 4B, in regions corresponding to the three series of reels R1, R2, and R3, a plurality of horizontally and obliquely transverse winning lines is printed. Further, on an upper portion of the variable display unit 4B, a payout number display unit 8 and a credit count display unit 9 are displayed. The variable display unit 4B on a middle stage side is tilted in such a manner that an upper portion thereof is tilted backward, enabling the player to play with a comfortable posture.

Between the variable display unit 4B on the middle stage and the lower display unit 4C, an operation table 10 projecting forward is provided on a front side of the cabinet 3. On the operation table 10, various operation buttons 11, such as a BET button, a collect button, a start button, a stop button as a control unit for instructing an execution of a game, are arranged. On the operation table 10, a coin insertion slot 12 and a bill insertion slot 13 are provided. Between the operation table 10 and the variable display unit 4B on the middle stage side, a ticket printer 14 and a card reader 15 are provided. Further, in the lowest portion of the cabinet 3, a coin tray 16 is provided.

A light emitting portion 20 is arranged on the cabinet 3 of the gaming machine 1 in a manner that the light emitting portion 20 encloses a gaming region including the upper display unit 4A, the variable display unit 4B on the middle stage, the lower display unit 4C, and the operation table 10. The light emitting portion 20 includes: side lamps 22 provided on an oblique base 21 at left-right ends of the cabinet 3, extending laterally on an arched line along the upper display unit 4A and the variable display unit 4B; speaker lamps 24 provided on a rim of a circular-arc-shaped speaker 23 at the left-right ends of the cabinet 3 and in the vicinity of the operation table 10, extending laterally; lower lamps 25 provided at the lower periphery of the lower display unit 4C; and top lamps 26 having power lamps 26*a* provided above the upper display unit 4A and arranged on both sides, and strip-shaped lamps 26*b* on a center arranged along a horizontal direction. Then, the light emitting portion 20 controls lamps to create an attractive illumination.

In the above-mentioned gaming machine 1, a light of the display unit 4 and the operation buttons 11 on the operation table 10 is augmented by the light emitting portion 20 disposed in a manner that it encloses the gaming region. Accordingly, an appeal of the gaming machine 1 to spectators is remarkably promoted by using the light which is a combination of the light of the display unit 4 and the operation buttons 11 on the operation table 10 within the gaming region and the light of the light emitting portion 20 enclosing the gaming region. Further, altering appropriately a lighting status and blinking status of the light emitting portions 20 may easily promote a differentiation from other models by means of a light. These make it possible to create an attractive gaming machine.

The gaming machine 1 further includes a topper performance apparatus 28 (performance apparatus) mounted on the cabinet 3. The topper performance apparatus 28 has the shape of a rectangular board and is arranged substantially parallel to the liquid crystal panel 5A of the upper display unit 4A.

On a front side of the topper performance apparatus 28, the plastic panel 28*a* on which images are photographed is mounted. It is configured such that the plastic panel 28*a* is lighted up by an embedded back-light 98 (not shown in FIG. 1). Further, on the front side of the topper performance apparatus 28, a plurality of LEDs 28*b* is arranged at even intervals along the upper and lower edges of the plastic panel 28*a*.

Next, an internal configuration of the above-mentioned gaming machine 1 will be described with reference to FIGS. 2 to 5.

Figure 2:
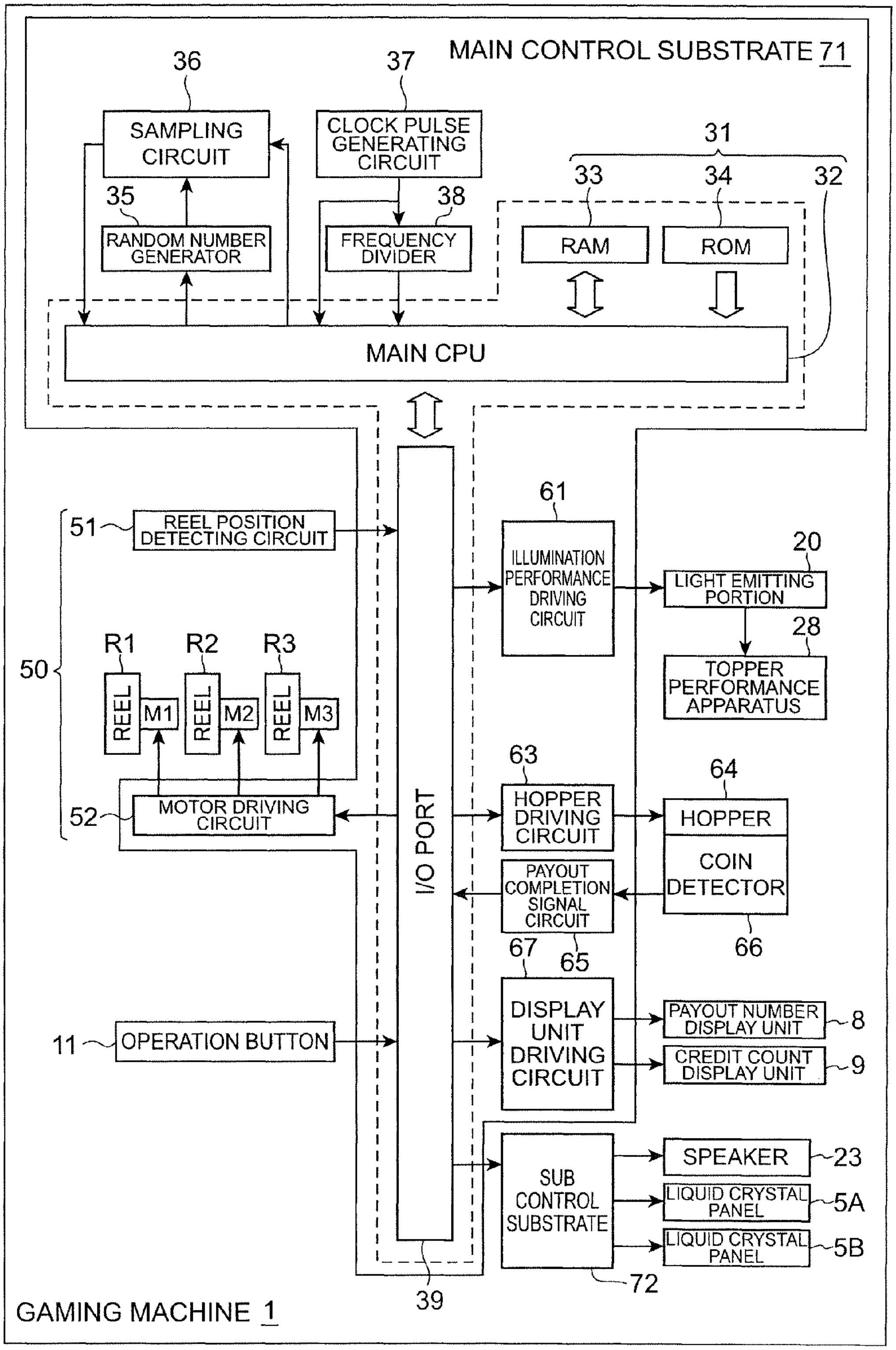
FIG. 2 is a block diagram showing an internal configuration of the entire gaming machine shown in FIG. 1

FIG. 2 is a block diagram showing an internal configuration of the entire gaming machine 1. As shown in FIG. 2, the gaming machine 1 includes a plurality of components with a main control substrate 71 including a microcomputer 31 as a center. The main control substrate 71 has the microcomputer 31, a random number generator 35, a sampling circuit 36, a clock pulse generating circuit 37, and a frequency divider 38, and further has an illumination performance driving circuit 61, a hopper driving circuit 63, a payout completion signal circuit 65, and a display unit driving circuit 67.

The microcomputer 31 has a main CPU 32, a RAM 33 and a ROM 34. The main CPU 32 operates according to a program stored in the ROM 34 and executes an operation control of the entire gaming machine 1 by inputting and outputting signals with other components via an I/O port 39. The RAM 33 stores data and programs used when the main CPU 32 operates, for example, a random number value sampled by the sampling circuit 36 described later is temporarily stored therein after a game starts, and code numbers and symbol numbers of the reels R1, R2 and R3 are stored therein. The ROM 34 stores programs executed by the main CPU 32 and permanent data.

The random number generator 35 operates according to an instruction of the main CPU 32 to generate a predetermined range of random numbers. The sampling circuit 36 extracts an arbitrary random number from among the random numbers generated by the random number generator 35 in accordance with the instruction from the main CPU 32 and inputs the extracted random number into the main CPU 32. The clock pulse generating circuit 37 generates a reference clock for bringing the main CPU 32 to operate, and the frequency divider 38 inputs into the main CPU 32 a signal obtained by frequency-dividing the reference clock by a certain period.

A reel driving unit 50 is connected to the main control substrate 71. The reel driving unit 50 has a reel position detecting circuit 51 for detecting each position of reels R1, R2 and R3, and a motor driving circuit 52 for inputting driving signals into motors M1, M2 and M3 for rotating respective reels R1, R2 and R3. Input of the driving signals from the motor driving circuit 52 operates the motors M1, M2 and M3, each of which rotates each of the reels R1, R2 and R3.

Further, to the main control substrate 71, the operation buttons 11 such as the stop button for inputting a stop instruction of the above-mentioned reels R1, R2 and R3, the start button, the collect button and the BET button are connected, and it is configured such that a signal corresponding to each push of these buttons is input to the main CPU 32 via the I/O port 39.

Figure 3:
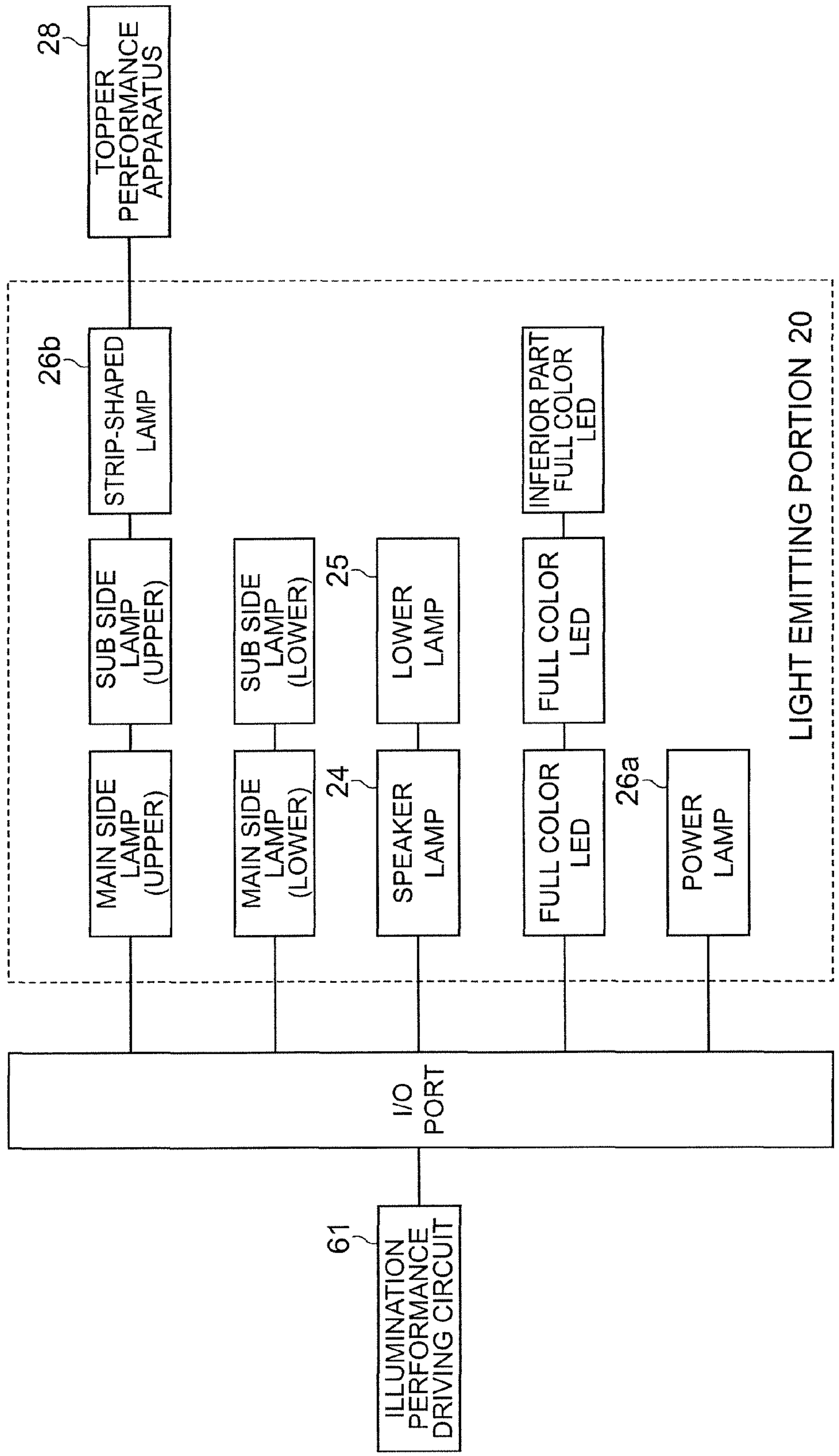
FIG. 3 is a block diagram showing a configuration of a light emitting portion shown in FIG. 2.

The illumination performance driving circuit 61 outputs a performance signal to make the above-mentioned light emitting portion 20 and topper performance apparatus 28 execute an illumination performance. As shown in FIG. 3, the light emitting portion 20 includes a plurality of lamps including the speaker lamps 24, the lower lamps 25, the power lamps 26*a* and the strip-shaped lamps 26*b*, and LEDs as described above. Main side lamps and sub side lamps as shown in FIG. 3 constitute the above-mentioned side lamps 22 provided on the oblique base 21. Further, full color LEDs shown in FIG. 3 adorn both left and right sides of the liquid crystal panel 5B provided on the sides of the liquid crystal panel 5B. The lower part full color LED lights up the coin tray 16. The topper performance apparatus 28 is connected to the illumination performance driving circuit 61 using a serial interface through the light emitting portion 20 having the above configuration.

The hopper driving circuit 63 makes a hopper 64 drive according to a control of the main CPU 32 and the hopper 64 operates for executing a payout of coins to make the coin tray 16 execute a payout of coins therefrom. A payout completion signal circuit 65 inputs data for a value of number of coins from a coin detector 66 connected thereto, and inputs a signal notifying a payout completion of coins to the main CPU 32 when the value of number has reached a preset value of number. The coin detector 66 measures the number of coins paid out by the hopper 64 and inputs data of the measured number value to the payout completion signal circuit 65. The display unit driving circuit 67 controls a display operation of various display units such as the payout number display unit 8 and the credit count display unit 9.

Figure 4:
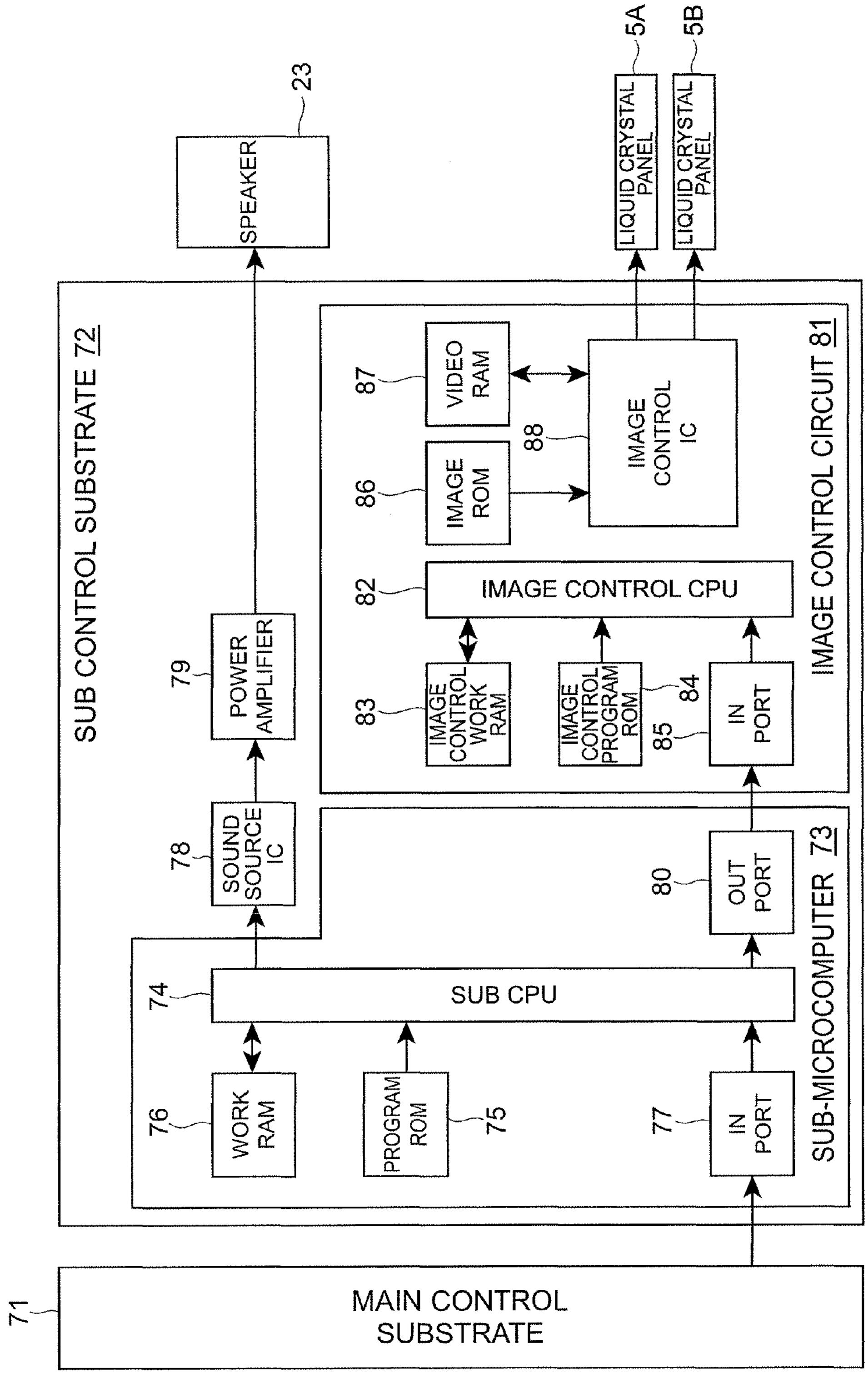
FIG. 4 is a block diagram showing an internal configuration of a sub control substrate shown in FIG. 2.

Further, a sub control substrate 72 is connected to the main control substrate 71. As shown in FIG. 4, the sub control substrate 72 receives a command from the main control substrate 71 to execute the display control of a liquid crystal panel 5A of the upper display unit 4A and the liquid crystal panel 5B of the variable display unit 4B, and an output control of a sound produced by the speaker 23. The sub control substrate 72 is configured on a circuit board different from the circuit board constituting the main control substrate 71, including a microcomputer (hereinafter referred to as "a sub-microcomputer") 73 as a main component, a sound source IC 78 for controlling a sound output from the speaker 23, a power amplifier 79 as an amplifier, and an image control circuit 81 operating as a display control means of the liquid crystal panels 5A, 5B.

The sub-microcomputer 73 includes a sub CPU 74 executing a control operation according to the control instruction transmitted from the main control substrate 71, a program ROM 75 as a storage means, a work RAM 76, and an I/O port 77, 80. Although the sub control substrate 72 does not include any of a clock pulse generating circuit, a frequency divider, a random number generator, and a sampling circuit, it is configured so as to execute a random number sampling on an operation program executed by the sub CPU 74. The program ROM 75 stores a control program to be executed on the sub CPU 74. The work RAM 76 is configured as a temporary storage means when the above-mentioned control program is executed on the sub CPU 74.

The image control circuit 81 includes an image control CPU 82, an image control work RAM 83, an image control program ROM 84, an image ROM 86, a video RAM 87, and an image control IC 88. The image control CPU 82 determines an image to be displayed on the liquid crystal panels 5A and 5B based on parameters set by the sub-microcomputer 73 according to an image control program stored in the image control program ROM 84.

The image control program ROM 84 stores the image control program and various selection tables relating to a display on the liquid crystal panels 5A and 5B. The image control work RAM 83 is configured as a temporary storage means when the image control program is executed on the image control CPU 82. The image control IC 88 forms an image in accordance with contents determined by the image control CPU 82 to output it to the liquid crystal panels 5A and 5B.

The image ROM 86 stores dot data for forming an image. The video RAM 87 functions as a temporary storage means when the image control IC 88 forms an image.

Figure 5:
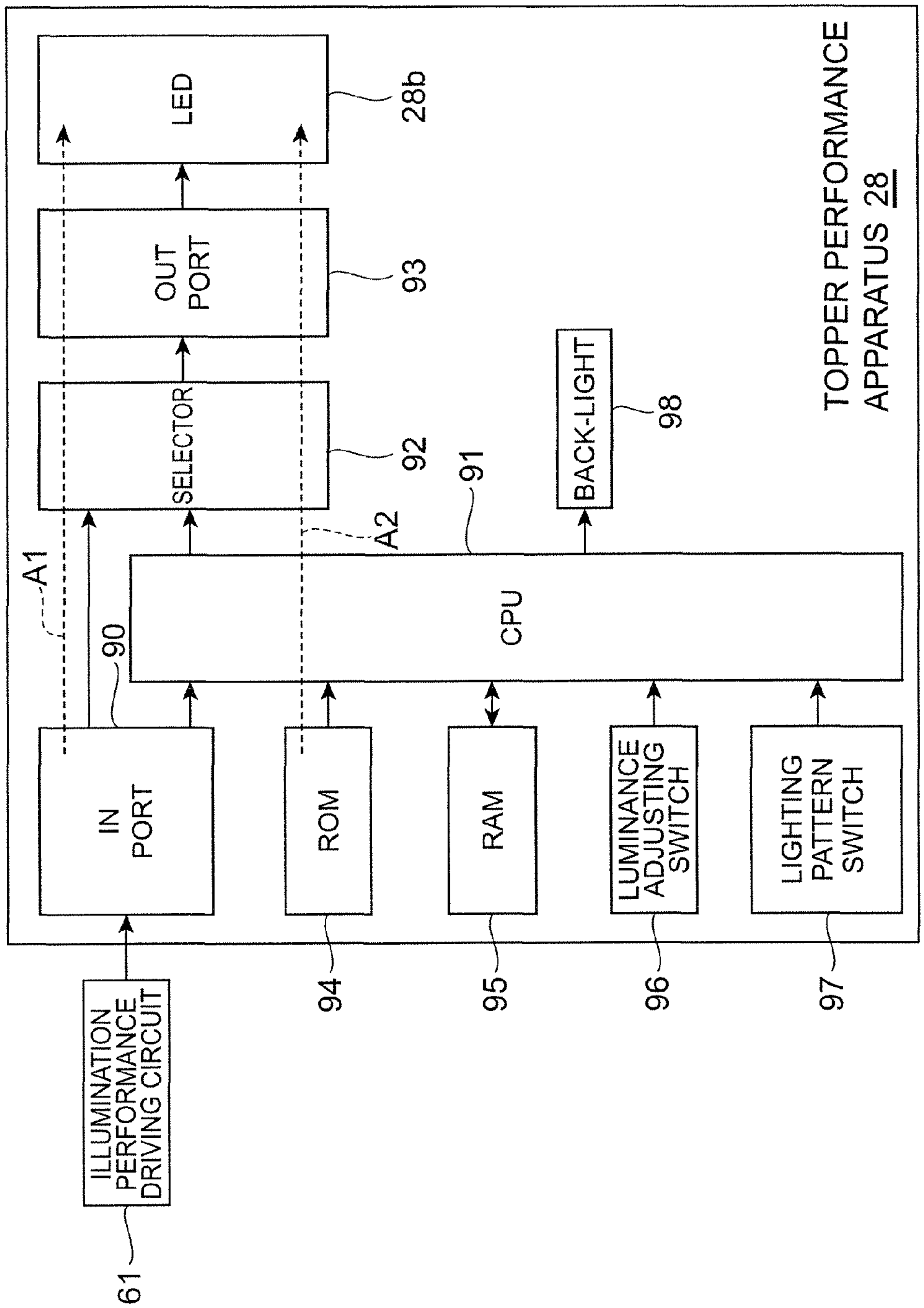
FIG. 5 is a block diagram showing an internal configuration of a topper performance apparatus shown in FIG. 2.

FIG. 5 is a block diagram showing an internal configuration of the topper performance apparatus 28 of the gaming machine 1. As shown in FIG. 5, the topper performance apparatus 28 includes an IN port 90 for accepting information from the illumination performance driving circuit 61 provided outside the apparatus, a CPU 91 for executing various computation processes, a selector 92 for executing a selection output of a performance signal, and an OUT port 93 for transmitting the performance signal to the LED 28*b*.

As described above, the IN port 90 of the topper performance apparatus 28 is connected to the illumination performance driving circuit 61 of the main control substrate 71 using serial interface through the light emitting portion 20. The IN port 90 is a performance information accepting means (accepting unit) of the present invention, and accepts from the illumination performance driving circuit 61, the performance information (hereinafter referred to as "the first performance information") relating to illumination performance of the topper performance apparatus 28. The first performance information contains the performance contents information for instructing the performance contents such as lighting patterns of each LED 28*b*. For this reason, the LED 28*b* as a performance means (performance unit) of the present invention executes the illumination performance according to the performance contents information contained in the first performance information when the first performance information as the performance signal has been output from the OUT port 93. In addition, the first performance information accepted by the IN port 90 is parallel output to the CPU 91 and the selector 92.

A ROM 94 and a RAM 95 as a performance information storage means (memory) of the present invention are connected to the CPU 91. The ROM 94 stores the performance information (hereinafter referred to as "second performance information") relating to the illumination performance of the topper performance apparatus 28. The second performance information contains the performance contents information for instructing the performance contents such as lighting patterns of each LED 28*b* similarly to the first performance information, however, the performance contents information is different from that contained in the first performance information.

The CPU 91 outputs to the selector 92, the performance signal according to the performance contents information contained in the second performance information stored in the ROM 94 when a predetermined performance condition has been fulfilled, and sends to the selector 92, a switch command instructing to output the performance signal instead of the first performance information. Here, the predetermined performance condition in the present embodiment is that there is no input of the first performance information from the IN port 90 to the CPU 91. Namely, if there is no input of the first performance information from the IN port 90 to the CPU 91, the CPU 91 outputs to the selector 92, the performance signal corresponding to the second performance information and sends the switch command to the selector 92. In addition, other examples of the predetermined performance condition are an elapse of prescribed time, an arrival of prescribed hour, or a receipt of a specific signal from the illumination performance driving circuit 61, not limited to the above-mentioned conditions.

The selector 92 outputs to the LED 28*b* via the OUT port 93 based on the switch command sent from the CPU 91, one of the performance signal according to the first performance information sent from the IN port 90 and the performance signal according to the second performance information sent from the CPU 91. Namely, the above-mentioned CPU 91, the selector 92, and the OUT port 93 constitute a performance signal output means (output unit) of the present invention, and the performance signal output means outputs to the LED 28*b* on the basis of the predetermined performance conditions, one of the performance signal based on the first performance information accepted by the IN port 90 and the performance signal based on the second performance information stored in the ROM 94.

Further, a luminance adjusting switch 96, a lighting pattern switch 97, and the back-light 98 are connected to the CPU 91. The luminance adjusting switch 96 is a DIP switch for controlling time interval of ON/OFF of each LED 28*b* to adjust luminance, which sends to the CPU 91 a signal to make the CPU 91 execute the multi-stage luminance adjustment (e.g. four-stage adjustment). The lighting pattern switch 97 is a switch used to set the lighting patterns of the LED 28*b* as the performance change condition described later, which inputs to the CPU 91, a signal to make the CPU 91 set various lighting patterns. In addition, the CPU 91 makes only the LEDs 28*b* in a predetermined portion among a plurality of LEDs 28*b* light/blink, and thereby the lighting pattern which is currently set may be confirmed. The back-light 98 is an illumination unit for lighting up the plastic panel 28*a* of the above-mentioned topper performance apparatus 28 in accordance with the output signal of the CPU 91, and, for example, a cold-cathode tube may be adopted.

Figure 6:
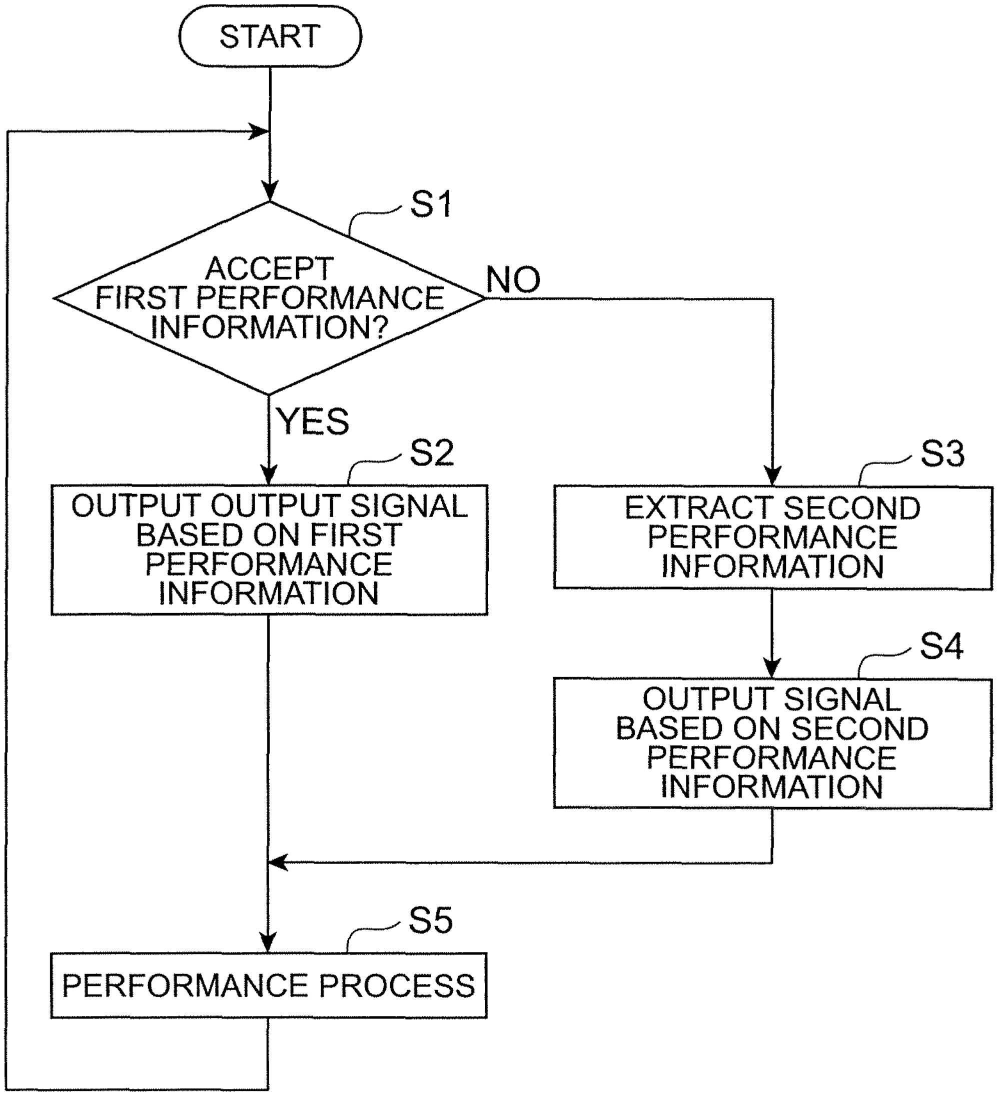
FIG. 6 is a flow chart showing a procedure of a performance process in the topper performance apparatus of the present invention.

Subsequently, a procedure of the performance process of the topper performance apparatus 28 will be described with reference to FIG. 6.

The CPU 91 continually or intermittently monitors whether the IN port 90 accepts the first performance information based on the reception of the first performance information sent from the IN port 90 to determine the performance conditions (Step 1). If the CPU 91 has detected the reception of the first performance information from the IN port 90, the CPU 91 sends to the selector 92, the switch command for making the selector 92 output the performance signal according to the first performance information, and the performance signal is output from the selector 92 to the LED 28*b* via the OUT port 93 (Step 2).

On the other hand, the CPU 91 determines the performance conditions (Step 1). The CPU 91 extracts the second performance information from the ROM 94 (Step 3), if not having detected the reception of the first performance information from the IN port 90. The CPU 91, then sends to the selector 92, the switch command for making it output the performance signal of the second performance information together with the performance signal according to the second performance information. Subsequently, the performance signal sent to the selector 92 from the CPU 91 is output to the LED 28*b* from the selector 92 via the OUT port 93 (Step 4).

Then, the LED 28*b* executes the performance according to the performance signal sent from the OUT port 93 (Step 5). The topper performance apparatus 28 repeats the above-mentioned Steps 1 to 5 as the performance process. Therefore, if the first performance information is input to the topper performance apparatus 28 from the illumination performance driving circuit 61, the LED 28*b* executes the illumination performance according to the performance signal of the first performance information as indicated by an arrow A1, which is shown in FIG. 5. On the other hand, if the first performance information is not input to the topper performance apparatus 28 from the illumination performance driving circuit 61, the LED 28*b* executes the illumination performance according to the performance signal of the second performance information stored in the ROM 94 of the topper performance apparatus 28 indicated by an arrow A2, which is shown in FIG. 5.

That is, in the topper performance apparatus 28, the LED 28*b* may execute not only the illumination performance according to the performance signal of the first performance information accepted from outside (specifically, from the main control substrate 71, which is outside of the topper performance apparatus 28), but also the performance according to the performance signal of the second performance information stored in the ROM 94. Accordingly, diversity of the performance is promoted and the performance can be executed with more seasoning. Further, even if the input of the first performance information to the topper performance apparatus 28 from the illumination performance driving circuit 61 is interrupted due to a disconnection of line or the like, the performance according to the second performance information is executed, enabling continuous execution of the performance by the topper performance apparatus 28.

In the above-mentioned embodiment, as the first performance information contains the performance contents information relating to the performance contents of the LED 28*b*, it is not necessary for the topper performance apparatus 28 to store the performance contents information thereof. Namely, a necessity of providing in the topper performance apparatus 28 new storage means intended for the above-mentioned performance contents information or assigning part of a storage area of the ROM 94 storing the second performance information, is eliminated, and thereby an effective utilization of the storage area of the topper performance apparatus 28 may be promoted.

However, as needed, it is possible to employ a modified embodiment that the ROM 94 beforehand stores at least part of the performance contents information relating to the performance contents of the LED 28*b*, and when the first performance information has been input to the IN port 90, the CPU 91 extracts the performance contents information to send it to the LED 28*b*. For example, the ROM 94 may beforehand store performance contents information relating to the lighting pattern of the LED 28*b*, and when the first performance information including only lighting timing as the performance contents information has been input to the IN port 91, the CPU 91 may extract the performance contents information relating to the lighting pattern, which is included in the first performance information, in order to send it to the LED 28*b*.

Further, in the above-mentioned embodiment, the topper performance apparatus 28 is connected to the illumination performance driving circuit 61 of the main control substrate 71 using serial interface through the light emitting portion 20. Adopting such serial connection enables an expansion of the light emitting portion and the performance apparatus, which, further, promotes a reduction of a wiring required for the connection.

In addition, though according to the above-mentioned embodiment, a single second performance information is stored in the ROM 94, it may be appropriately that a plurality of the second performance information containing different performance contents information is stored therein. In this case, in a performance process of the topper performance apparatus 28 in Step 3, the CPU 91 selects one from among a plurality of the second performance information to be extracted, and in Step 4, the CPU 91 outputs to the LED 28*b*, the performance signal of the selected second performance information (see FIG. 6). Thus storing the plurality of second performance information in the ROM 94 makes it possible for the topper performance apparatus 28 to realize diverse performances depending upon a way how the CPU 91 selects the second performance information.

In the above-mentioned modified embodiment in which the plurality of second performance information is stored in the ROM 94, it may be configured such that the CPU 91 alters the second performance information to be selected from the ROM 94 each time the performance change condition is fulfilled in Step 3. Examples of the performance change condition are an elapse of prescribed time, an arrival of prescribed hour, whether receiving or not receiving a change signal from the illumination performance driving circuit 61, or a signal input of the lighting pattern switch 97. In case of the example of changing the second performance information to be selected according to the signal input of the lighting pattern switch 97 as the performance change condition, it may be configured such that an operation of the lighting pattern switch 97 sets an arbitrary second performance information.

By altering the second performance information to be selected from the ROM 94 according to the performance change condition in this way, the topper performance apparatus 28 may realize diverse performance forms according to the performance change condition. Here, the second performance information to be selected from the ROM 94 is not necessarily altered. Only re-determining the second performance information to be selected by a lottery randomly may realize diverse performance forms each time the performance change condition is fulfilled.

In addition, the performance apparatus has been described by taking the topper performance apparatus 28 as an example, the entire gaming machine 1 including the topper performance apparatus 28 may be the performance apparatus of the present invention. In this case, the gaming machine 1 has same or similar system as the system in a block diagram of the topper performance apparatus 28 in shown FIG. 5, and accepts the first performance information from outside of the gaming machine 1 (e.g., a different gaming machine, or a gaming server). The gaming machine 1, then, outputs one of the performance signal based on the first performance information and the performance signal based on the second performance signal stored in the performance information storage means of the gaming machine 1 (e.g. ROM 34) to make the performance means (e.g., the light emitting portion 20, or the speaker 23) execute a performance according to the signal on the basis of the predetermined performance conditions. By this configuration, even in case where the gaming machine 1 itself is the performance apparatus, a diversification of the performance by the gaming machine 1 may be promoted similarly in a case where the topper performance apparatus 28 is the performance apparatus, thus enabling to execute the performance with more seasoning.

As described above in detail, according to the present invention, it is possible to execute a performance with more seasoning.

Specifically, a gaming machine according to the present invention includes: a performance information accepting means for accepting first performance information from an outside of the performance apparatus; a performance information storage means for storing second performance information; a performance signal output means for outputting one of a performance signal based on first performance information accepted by the performance information accepting means and a performance signal based on second performance information stored in the performance information storage means on the basis of a predetermined performance condition; and a performance means for executing a performance according to a performance signal output from the performance signal output means.

In the above performance apparatus, the performance signal output means for outputting the performance signal to the performance apparatus outputs one of the performance signal based on the first performance information and the performance signal based on the second performance signal on the basis of predetermined performance conditions. That is, the performance apparatus executes not only the performance according to the performance signal based on the first performance information accepted from the outside, but also the performance according to the performance signal based on the second performance information stored on the performance information storage means. This promotes diversity of the performance in the performance apparatus according to the present invention, enabling to execute the performance with more seasoning.

Further, the first performance information may contain performance contents information relating to performance contents of the performance means, and the performance signal output means may output the performance signal according to the performance contents information contained in the first performance information as the performance signal based on the first performance information. In this case, it is not necessary for the performance contents information to store all the performance contents information relating to the performance contents of the performance means in the performance apparatus, eliminating a necessity to provide new storage means or assign part of a storage area of the performance information storage means in which the second performance information is stored.

Further, the performance information storage means may store a plurality of the second performance information, and the performance signal output means may select one from among the plurality of second performance information to output the performance signal based on the selected second performance information, when outputting the performance signal based on the second performance information. In this case, the performance by the performance apparatus may be more diversified.

Further, preferably, the performance signal output means may select one from among the plurality of the second performance information to output the performance signal based on the selected second performance information each time a performance change condition is fulfilled, when outputting the performance signal based on the second performance information.

In this case, the performance apparatus may realize diverse performance forms according to the performance change conditions.

The present invention is not limited to the foregoing preferred embodiment, and various modifications thereof can be made. For example, the performance means may be an apparatus for executing an acoustic performance or a visual performance, not limited to the LED 28*b* executing an illumination performance.

What is claimed is:

1. A performance apparatus which is mounted directly above a single gaming machine, the gaming machine having a first processor and storing first performance information concerning a performance of the performance apparatus, the performance apparatus executing the performance in accordance with the first performance information output from the single gaming machine, the performance apparatus comprising:

an input portion connected to a performance driving circuit of a main control substrate of the single gaming machine via serial interface through a light emitting portion connected to the performance driving circuit, the input portion accepting the first performance information output from the first processor of the single gaming machine mounted directly to the performance apparatus, a memory for storing second performance information indicating the performance of the performance apparatus, the second performance information being different from the first performance information;

a second processor which is different from the first processor of the single gaming machine;

a selector for selective outputting a performance signal in accordance with a command signal from the second processor; and a performance portion that executes the performance in accordance with the performance signal selectively output from the selector when a predetermined performance condition has been fulfilled, wherein the second processor of the performance apparatus is configured to:

determine whether the input portion accepted the first performance information output from the performance driving circuit of the single gaming machine to determine whether the predetermined performance condition has been fulfilled;

output to the selector, a performance signal corresponding to the accepted first performance information and a switch command instructing to output the performance signal corresponding to the first performance information, when it is determined that the input portion accepted the first performance information, resulting that the predetermined performance condition has not been fulfilled; and extract the second performance information from the memory of the performance apparatus, and output to the selector, a performance signal corresponding to the second performance information stored in the memory of the performance apparatus and a switch command instructing to output the performance signal corresponding to the second performance information when it is determined that the input portion did not accept the first performance information, resulting that the predetermined performance condition has been fulfilled; and the selector selects and outputs to the performance portion, one of the performance signal corresponding to the first performance information output from the input portion and the performance signal corresponding to the second performance information output from the second processor, based on the switch command output form the second processor, wherein the performance apparatus is enclosed in a first housing that is mounted directly on a surface of a second housing that encloses the single gaming machine; and wherein the performance apparatus further comprises a lighting pattern switch connected to the second processor, wherein:

a plurality of second performance information is stored in the memory of the performance apparatus, and in response to a signal input from the lighting pattern switch, as a performance change condition, the second processor of the performance apparatus is configured to change the second performance information extracted from the memory.

2. The performance apparatus according to the claim 1, wherein the performance portion is made up of any one of an apparatus for executing a visual performance, an apparatus for executing an illumination performance, and an apparatus for executing an acoustic performance.

3. The performance apparatus according to claim 1, wherein when it is determined that the first performance information is not input from the input portion to the second processor, as a performance change condition, the second processor randomly extracts at least one of the plurality of second performance information stored in the memory.

4. A performance apparatus which is mounted directly above a single gaming machine, the gaming machine having a first processor and storing first performance information concerning a performance of the performance apparatus, the performance apparatus executing the performance in accordance with the first performance information output from the single gaming machine, the performance apparatus comprising:

an input portion connected to a performance driving circuit of a main control substrate of the single gaming machine via serial interface through a light emitting portion connected to the performance driving circuit, the input portion accepting the first performance information output from the first processor of the single gaming machine mounted directly to the performance apparatus, a memory for storing second performance information indicating the performance of the performance apparatus, the second performance information being different from the first performance information;

a second processor which is different from the first processor of the single gaming machine;

a selector for selective outputting a performance signal in accordance with a command signal from the second processor; and a performance portion that executes the performance in accordance with the performance signal selectively output from the selector when a predetermined performance condition has been fulfilled, wherein the second processor of the performance apparatus is configured to:

determine whether the input portion accepted the first performance information output from the performance driving circuit of the single gaming machine to determine whether the predetermined performance condition has been fulfilled;

output to the selector, a performance signal corresponding to the accepted first performance information and a switch command instructing to output the performance signal corresponding to the first performance information, when it is determined that the input portion accepted the first performance information, resulting that the predetermined performance condition has not been fulfilled; and extract the second performance information from the memory of the performance apparatus, and output to the selector, a performance signal corresponding to the second performance information stored in the memory of the performance apparatus and a switch command instructing to output the performance signal corresponding to the second performance information when it is determined that the input portion did not accept the first performance information, resulting that the predetermined performance condition has been fulfilled; and the selector selects and outputs to the performance portion, one of the performance signal corresponding to the first performance information output from the input portion and the performance signal corresponding to the second performance information output from the second processor, based on the switch command output form the second processor, wherein the performance apparatus is enclosed in a first housing that is mounted directly on a surface of a second housing that encloses the single gaming machine; and, wherein a portion of the second performance information stored in the memory relates to the first performance information, and when the first performance information is input to the input portion of the performance apparatus, the second processor extracts the portion of the second performance information related to the first performance information from the memory, and transmits the portion of the second performance information related to the first performance information to the performance portion.

5. The performance apparatus according to the claim 4, wherein the performance portion is made up of any one of an apparatus for executing a visual performance, an apparatus for executing an illumination performance, and an apparatus for executing an acoustic performance.

6. The performance apparatus according to claim 4, wherein a plurality of second performance information is stored in the memory of the performance apparatus, and when it is determined that the first performance information is not input from the input portion to the second processor, as a performance change condition, the second processor randomly extracts at least one of the plurality of second performance information stored in the memory.

* * * * *